Sept. 17, 1963 W. BACH ET AL 3,103,863
LOUVRE SHUTTER OPERATING MECHANISM
Filed Dec. 13, 1960 2 Sheets-Sheet 1
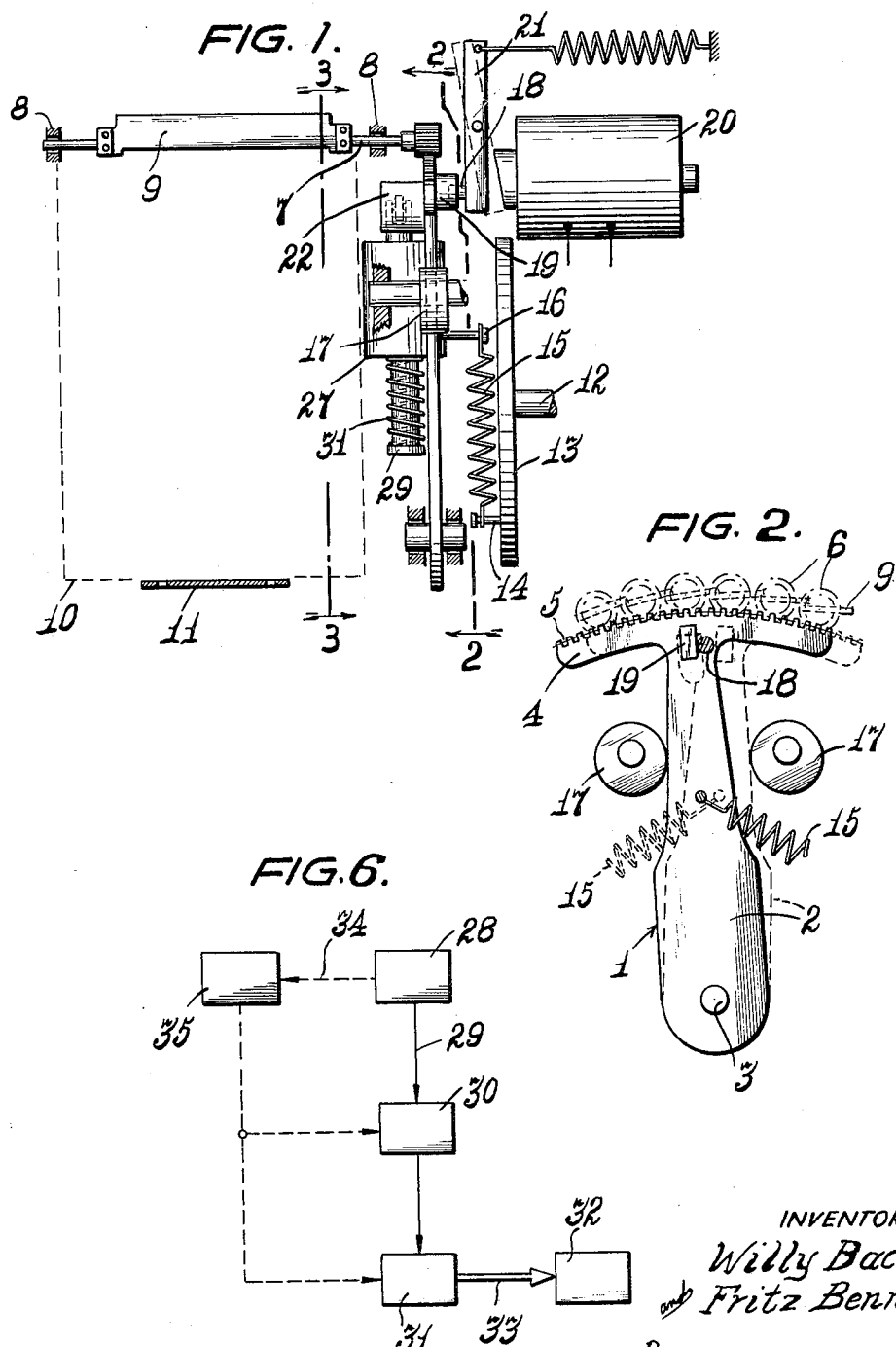
INVENTOR
Willy Bach
and Fritz Bennat
By: Samuel W. Kipnis
Attorney Sept. 17, 1963    W. BACH ET AL    3,103,863
LOUVRE SHUTTER OPERATING MECHANISM
Filed Dec. 13, 1960    2 Sheets-Sheet 2
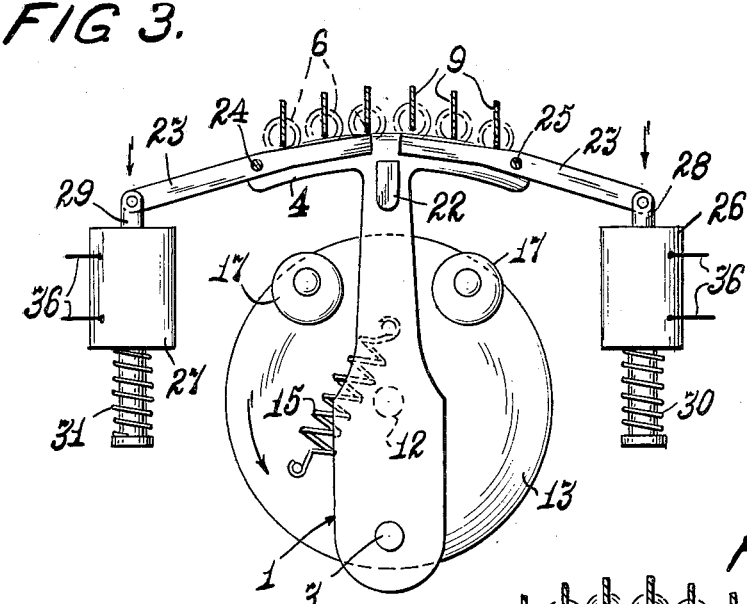
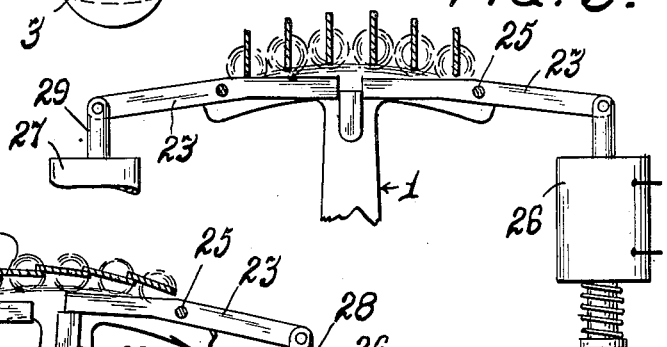
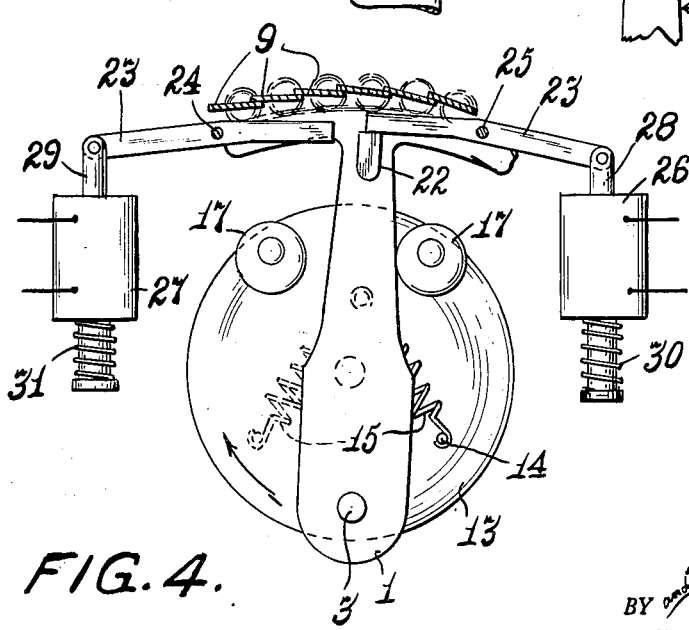
INVENTOR.
Willy Bach
BY Fritz Bennat
Samuel W. Kipnis
Attorney, United States Patent Office 3,103,863
Patented Sept. 17, 1963

3,103,863
LOUVRE SHUTTER OPERATING MECHANISM
Willy Bach, Berlin-Wilmersdorf, and Fritz Bennat, Berlin-Neukolln, Germany, assignors to Continental Elektro-industrie A.G., Askania-Werke, Berlin-Mariendorf, Germany, a corporation of Germany
Filed Dec. 13, 1960, Ser. No. 75,637
2 Claims. (Cl. 95—58)

This invention relates to improvements in a louver shutter mechanism specifically adapted for an automatic series camera of a photographically registering instrument for following a target and in which the shutter blades serving to close the shutter aperture are carried firmly on rotatable supporting shafts and are forcibly displaced from one closing position through an open position and into another closing position by means of an actuating member common to all the shafts. Displacement of the blades is effected by forces which preferably are released electromagnetically, which forces, for instance, may be generated by pretensioned springs, these forces serving to move the actuating member from one terminal position to the other terminal position.

More specifically, the present invention relates to louver shutters which are released electrically by an electrical impulse, the shutter actuating member being acted upon, for instance, by a resilient force released by electromagnetic release of a mechanical detent and thereby put in motion to move the shutter blades from one closure position to their second closure position.

It is an object of this invention to provide shutters of this and similar types with means for holding the shutter blades open for any desired length of time, the exposure periods obtainable with the shutter being predeterminable and, with respect to their duration in the direction of short time intervals not being subject to any limitations not due to the mechanical construction of the shutter itself. Such a structure is required for instruments for following a target. For instance, when the instrument is to be used for photographing explosive flashes; it is not necessary to make a series of photographs of the target. In the use of shutters of this general type which, due to their construction, are not adapted for use in such longer lasting exposures, there is needless consumption of photographical registering recording material or film.

Louver shutters are known in which the shutter blades are brought into open position by having the driving means for the shutter released from the blade actuating means by means of a clutch, the blades then, by means of a lever system, being opened by displacement of the actuating means and fixed in this position. The operations required for opening the blades in such a shutter are performed manually. It has also been proposed to produce these operations simply by electrically energizing a relay, so that, for instance, in instruments for following a target, of the type of conventional recording theodolites the usual actuation of the camera from a distance can be carried out, which facilitates the synchronization of several recording theodolites which are connected together at a single measuring station. However, known means required for this purpose are complicated and also do not permit the shortening of the exposure period desired for instantaneous shots. Further, rotatable blade shutters for instruments for following targets are known which operate in conjunction with a leaf shutter.

The present invention is concerned with a practical development of a louver shutter of simple design and makes it possible, when such shutters are used, to carry out prolonged exposures of the recording material. This invention provides a louver shutter having shutter blades rotatably arranged by means of shafts, which blades are displaceable from a first blade closure position to a second blade closure position by the forcible action of an actuating member common to all the blades and movable in two directions. The blade actuating member is subject to the action of tension springs which on release of the shutter, act to move the actuating member from one terminal position to a second terminal position. The shutter of the present invention is further characterized by the fact that stop members are provided which are movable into and out of the path of the actuating member. These stop members may be moved by electromagnetic means into the path of the actuating member to limit the stroke of this member to the open position of the shutter blades.

A further development of this invention provides for connecting these stop members with a magnet system energized by electrical impulses so that the stop members may be moved into the path of the actuating member by a simple impulse energizing of this magnet system. In the present disclosure, the louver shutter mechanism embodies the provision of a magnet system for actuating the stop members which is so designed that its attraction period is short as compared with the attraction period of the releasing magnet system. Further, according to this invention, the device is so designed that, after energization of the magnet system serving to actuate the stop members for holding the shutters in open position and after release of the shutter, a repeated actuation of the release impulse for the camera shutter causes a closure of the shutter by deenergization of the magnet system to permit the stop members to move from the path of the actuating member and permit closing of the shutter.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a side elevational view of an exemplary louvered shutter and control mechanism embodying the feature of the invention, showing support structure fragmentarily and in section.

FIG. 2 is an elevational view of the shutter operating mechanism, taken substantially on line 2—2 of FIG. 1, showing the shutter blades in a closed position.

FIG. 3 is a vertical sectional view of the control mechanism taken substantially on line 3—3 of FIG. 1, showing the shutter blades in open position.

FIG. 4 is a view similar to FIG. 3 showing the shutter blades in closed position.

FIG. 5 is a fragmentary view similar to FIG. 3 showing the shutter blades locked in open position.

FIG. 6 is a schematic diagrammatic view of the control system.

Referring particularly to the exemplary embodiment of the invention shown in the accompanying drawings and particularly to FIGS. 1 to 3, a T-shaped closure actuating member 1 has its stem 2 rotatably mounted at its lower end on a fixed shaft 3. Its other or head end 4 is arched with its radii centered on shaft 3 and provided on its outside edge with a series of teeth 5 so as to form a toothed segment. The toothed segment is meshed at all times with a series of pinions 6, each of which is fixedly disposed on one of a multiple of spaced parallel rotatable shafts 7 journalled in fixed bearings 8. The rotatable shafts 7 each carry a shutter blade 9, all of which overlie the aperture to be closed which, in this instance, is the exposure opening of a photographic device or camera 10 having a photosensitive film 11 therein. A rotatable shaft 12, carrying a disc 13 is arranged in front of the actuating member 1 which is adapted to be intermittently rotated by means not shown specifically on the drawing. The disc 13 carries at one point of its periphery, a pin or other means 14 for attaching one end of a tension spring 15, the other end of which is attached, as at 16, to the stem 2 of actuating member 1. In the position of the actuating member 1 illustrated in FIGS. 2 and 4, the actuating member 1 in abutment with one of a pair of stop elements 17 and the shutter blades 9 are in open position.

Means for electromagnetically releasing and holding of the actuating member 1 in the two terminal positions of blades 9 (in a closed position) consists generally of an electromagnetically actuated detent 18 adapted to engage means, such as stop 19, on the actuating member 1, and which is capable of holding actuating member 1 in one or the other of its terminal positions corresponding to closed positions of the blades. Impulse energization of a release magnet 20, controlling said detent 18 through its lever mounting 21, releases the detent from actuating member 1 and the force of spring 15 (shown tensioned in FIG. 2) then moves the actuating member to its other terminal position or shutter closed position.

The actuating member 1 also carries second projection 22 on its other face which serves as stop means for holding the shutters in an open position, as when a time exposure is to be made. The projection 22 functions in connection with two, two-armed levers 23—23 (best shown in FIGS. 3–5) which are rotatably journalled on fixed shafts 24 and 25 respectively, one above each of two lifting magnets 26 and 27. The armatures 28 and 29 of the two magnets are connected one to each of levers 23 and they are under the influence of pretensioned springs 30 and 31 respectively, which constantly urge respective levers 23 about their respective shafts 24 and 25 in the direction of the arrows shown in FIG. 3 of the drawing. In the position of the two levers shown in FIG. 5, the magnets 26 and 27 are energized whereby the two levers are brought into positions wherein the lever ends are disposed in the paths of projection 22 to stabilize the actuating member and hold the blades 9 in the FIGS. 1–5 open position. When the magnets 26 and 27 are deenergized, the levers are rocked by the respective tensioned springs 30 and 31 into the tilted or non-engaging position shown in FIG. 3 where they remain until the magnets 26—27 are again energized. Immediately upon release of levers 23 from stop 22, the actuating member functions to close the shutter blades.

The above described arrangement functions as follows:

For instantaneous exposure, the levers 23 are held out of engagement with the stop projection 22 and the tensioned spring 15 acts to pull the actuating member 1 into one of its two terminal positions, such as is shown in full lines in FIG. 2, and into engagement with the other stop element 17 as shown in broken lines in FIG. 2, to hold the shutters in closed position. Preferably, the stop elements 17 are eccentrics mounted for rotatable adjustment so as to insure that the actuating member comes to rest in a predetermined shutter closed position to avoid damage to the shutter. When the actuating member is in either of its closed positions the detent 18 moves into the path of stop 19, holding the shutter in such closed position.

Tensioning of spring 15 is effected by rotation of disc 13. Specifically, when the actuating member is locked in one terminal position, as in full lines in FIG. 2, the magnet 20 is energized to withdraw detent 18 from the path of stop 19. The spring tensioning disc 13 is then rotated by means to be discussed hereinafter to carry the tension spring 15 from its dotted line position shown in FIG. 2, into the full line position shown. However, as soon as the spring holding pin 14 passes dead center during disc rotation, the actuating member is snapped into its FIG. 2 broken line position and in so doing has caused the shutter blades to rotate about 180° from a first closed position, through open position and into a second closed position.

In the event prolonged exposure is desired, the magnets 26 and 27 are energized before the stop means 18 holding the actuating member is released, and the levers 23 will be tensioned to move into the position substantially as shown in FIG. 4. Because of the spatial arrangement of the levers and projection 22, the projection 22 moves, on release of the actuating member 1 under the influence of the tension of the spring 15, out from beneath one of the two levers and strikes the opposing end of the other lever, so as to restrain the actuating member in the FIG. 5 position and with the shutter blades in open position. When the magnets 26 and 27 are deenergized, the engaged lever is withdrawn from the path of projection 22 and spring 17 will pull the actuating member into its other terminal position to again close the shutters.

As previously noted, the device, specifically, the electrical combination (hereinafter described) of the two magnets 26 and 27, is arranged in connection with release magnet 20 in such fashion that, eventually in combination with further relays, the terminal stopping of the actuating member 1 for closing the shutter is effected by a release impulse of the same nature as the impulse for releasing the louver shutter. In general, the device is so designed that by actuation of a stand-by impulse key (not shown) all relays provided are brought into a condition which, on release of the release impulses proper to the shutter, if necessary, effects the simultaneous actuation of the release magnet system and the two magnets 26 and 27. In such an arrangement the pull or attraction period of magnets 26 and 27 must be short as compared with the release magnets.

An electrical combination or system operable as control or actuating means for the hereinabove described shutter control system may be substantially as illustrated diagrammatically in FIG. 6. As there shown the system may include an electrical impulse generator 28 capable of generating periodic or non-periodic impulses. This is connected by lead 29 to a release magnet system 30 which operates in connection with the release magnet 20 to excite said magnet 20 for brief periods as when the detent 18 is to be withdrawn from engagement with stop 19. When this occurs the actuating member 1 is carried from its first shutter closing position into its second shutter closing position.

During this change over from first to second shutter closing positions for instantaneous exposure, the shutter is open for a brief period of time to allow for the passage of the image rays to film 11. As soon as the shutters reach their second closed position the detent 18 again engages the stop 19 to hold the shutter closed. Simultaneous with the energizing of release magnets 20, the release magnet system 30 causes a film feeding device 31 to be operated to advance the film 11 in the recording device or camera. A shutter tension system 32 for operating shaft 12 is coupled to the film feeding device in any mechanical manner, as indicated at 33, which when actuated causes simultaneous rotation of shaft 12 and its disc 13 for repositioning the position of tension spring 15 without moving the actuating member. The arrangement is such that the film transporting system 31 is operated with a slightly delayed action following operation of the release magnet 20.

In order to effect time exposures, the time of which extends beyond the period of exposure during instantaneous exposure described herinabove, the release impulse originating from impulse generator 28 is not transmitted through line 29 to the release magnet system 30 as before, but is fed through line 34 to an electrical time exposure magnet system 35 from which the two magnets 26, 27 are operated; said magnets receiving current through lines 36 so as to carry the lever ends into position for engagement with one of them by projection 22. Then, upon release of detent 18 through energization of magnet 20, the spring 15 will pull the actuating member 1 into position with its projection 22 abutting one of the levers 23. The shutters then are held in open position.

To close the shutters after such time exposure another impulse release by impulse generator 28 deenergizes magnets 26—27 thereby permitting the springs 30—31 to carry the levers out of projection engaging position and permitting the actuating member 1 to move into its other terminal position thus closing the shutters. Such final movement of the actuating member 1 is accomplished by simultaneous operation of the shutter tensioning device or disc 13.

The arrangement of the louver shutters according to the present invention has the advantage that the time lapse between the establishment of open shutter position and the command to shutter closure in time exposure operations can be varied between very short and long time intervals by selecting the time interval of the two impulses above mentioned. Further, it is obviously possible to use the louver shutter as a conventional series picture shutter.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent of the United States is:

1. In a louvered shutter mechanism, a plurality of shutter blades mutually spaced side by side and mounted on parallel axes for movement into closed and open positions, a spring tensioned actuating member operable to move said shutter blades from a first closed to an open position and then to a second closed position, electromechanical means holding said actuating member in a first shutter closed position, means to release said electromechanical means to permit said shutter blades to move into an open position, additional restraining means comprising stop means on the actuating member and electrically actuated levers engageable with said stop means operable to restrain movement of said actuating member beyond shutter open position, and electrical means operable to release said additional restraining means to permit the actuating member to move the shutter blades from said shutter open position into the second shutter closed position, said actuating member being held in said second shutter closed position by said electromechanical holding means.

2. In a louvered shutter mechanism, a plurality of shutter blades mutually spaced side by side and mounted on parallel axes for movement into closed and open positions, an actuating member operable to move said shutter blades from a first closed to an open position and then to a second closed position, electromechanical means holding said actuating member in first shutter closed position, rotatable means operable to tension said actuating member for movement when the electro-mechanical means is released, means to release said electromechanical means, additional stop means operable to restrain movement of said actuating member beyond shutter open position, electrical means operable to release said additional restraining means whereby said actuating member again operates to move the shutter blades from said shutter open position to the second shutter closed position, said actuating member being held in said second shutter closed position by said electromechanical holding means comprising stop means on the actuating member and electrically actuated detent means engageable therewith.

References Cited in the file of this patent

UNITED STATES PATENTS

| 1,913,182 | Williamson | June 6, 1933 |
| 2,393,575 | Steiner | Jan. 22, 1946 |
| 2,577,774 | Lee | Dec. 11, 1951 |

FOREIGN PATENTS

| 700,334 | France | Dec. 23, 1930 |